United States Patent [19]

Ito

[11] Patent Number: 4,807,919
[45] Date of Patent: Feb. 28, 1989

[54] INDICATOR MOUNTING STRUCTURE

[75] Inventor: Kentaro Ito, Saitama, Japan

[73] Assignee: Honda Giken Kogyo Kabushiki Kaisha, Tokyo, Japan

[21] Appl. No.: 40,680

[22] Filed: Apr. 21, 1987

[30] Foreign Application Priority Data

Apr. 21, 1986 [JP] Japan ............... 61-58746[U]

[51] Int. Cl.$^4$ .................. B62J 9/00; B62J 6/00
[52] U.S. Cl. .................. 296/37.1; 296/78.1; 340/134; 224/34 R
[58] Field of Search ............. 296/37.1, 37.12, 78.1; 280/289 A; 224/32 A, 32 R; D12/110; D26/28; 340/134, 119, 87

[56] References Cited

U.S. PATENT DOCUMENTS

| D. 270,436 | 9/1983 | Gaddi | D12/110 |
| D. 274,231 | 6/1984 | Kawashima et al. | D12/110 |
| 3,788,532 | 1/1974 | Bish | 224/32 A X |
| 4,163,513 | 8/1979 | Kramer | 224/32 A |
| 4,515,405 | 5/1985 | Ogishima | 296/78.1 |

FOREIGN PATENT DOCUMENTS

| 524557 | 12/1953 | Belgium . |
| 447147 | 4/1949 | Italy . |
| 480409 | 4/1953 | Italy . |
| 531825 | 8/1955 | Italy . |
| 767983 | 2/1957 | United Kingdom . |

OTHER PUBLICATIONS

Zeitschaftt, Aug. 1983, pp. 53 and 52.

Primary Examiner—Dennis H. Pedder
Attorney, Agent, or Firm—Lyon & Lyon

[57] ABSTRACT

The present invention provides a structure for mounting an indicator on a multi-wheeled vehicle, preferably of the underbone-type or scooter-type construction. In order to permit the placement of the indicator to be varied as well as to permit the selection of indicator structures to be varied, the present invention provides a substantially flat side surface on which to mount the indicator while at the same time defining a space behind the front shield of the multi-wheel vehicle for the storage of articles. Mounting of the present invention to the front shield may be accomplished through the use of engagement hooks coacting with engagement recesses in the front shield to properly position the partition member of the present invention. In addition, the present invention provides grooves for protecting the indicator electrical wires from damage or breakage as well as providing a space for the storage of articles and a generally more pleasing appearance than the arrangements of the prior art. The present invention also encompasses multiple partition members, each providing an appropriate mounting surface and defining a storage space behind the vehicle front shield. One embodiment of the present invention includes a recess formed in the partition member and a cover plate having an aperture partially covered by support projections for mounting over the recess and supporting the indicator.

9 Claims, 5 Drawing Sheets

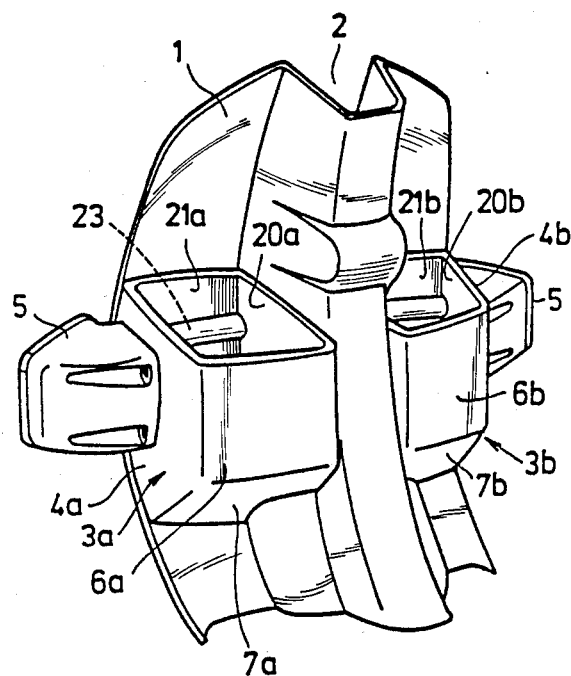
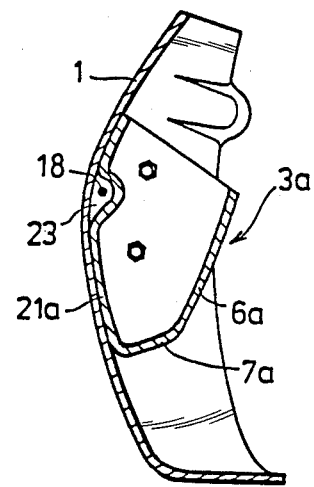
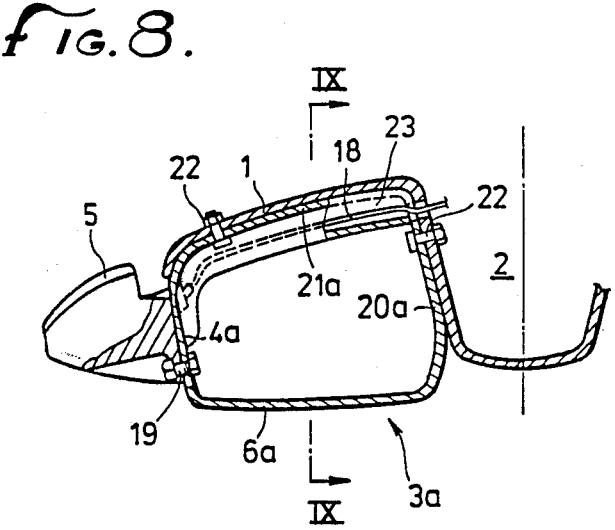

INDICATOR MOUNTING STRUCTURE

BACKGROUND OF THE INVENTION

The field of the present invention relates to instrument attachment mechanisms for small sized vehicles. In multi-wheeled vehicles having a scooter-type construction, the vehicle usually includes at least a frame and a seat. The frame is typically disposed in front of the seat in a low U-shaped configuration. Typically, a leg shield is provided to cover the front of the legs of a vehicle operator sitting on the seat. It is desirable to provide such a vehicle with a forwardly visible indicator, typically used for indicating the direction of a turn contemplated by the vehicle operator. As illustrated in FIG. 3, it is common for such an indicator to be mounted to a mounting bracket in the shape of a bar 101, typically consisting of a channel-shaped section having a longitudinal groove 108 extending across the scooter from the center frame. These mounting brackets 101 are typically laterally secured to the rear surface of the leg shield 102 by means of several bolts 103 and nuts 104. Indicators 105 are then typically cantilevered from the exterior ends of the mounting brackets and fastened thereto by threaded screws 106. When properly assembled, the indicator wires 107 are concealed by the groove 108 of the conventional mounting bracket 101.

One problem with the conventional indicator mounting system outlined above is that these systems typically have a large number of parts. In addition, the mounting bracket is exposed along the rear surface of the leg shield and presents an undesirable appearance. Moreover, since the indicators are mounted to the ends of the mounting brackets in a cantilevered fashion, the number of available indicator mounting positions as well as the construction and structure of the indicators is limited. Threading of the wires in such a system also complicates assembly.

SUMMARY OF THE INVENTION

The present invention provides a structure for mounting an indicator to a leg shield by providing a partition member which extends rearwardly from the leg shield and transversely across the longitudinal direction of the vehicle. Accordingly, the present invention provides an appropriate outer surface on which to mount the indicators as well as defining one or more cavities or storage spaces just rearwardly of the vehicle front shield. Moreover, the present invention acts to simplify the installation of the indicators as well as provide the vehicle, especially the side just in front of the vehicle operator, with a smooth and desirable appearance.

Accordingly, it is an object of the present invention to provide a structure for mounting one or more indicators, which will provide the above advantages. Other and more detailed advantages of the present invention will become apparent to those skilled in the art upon examination of the present disclosure.

BRIEF DESCRIPTION OF THE DRAWING

FIG. 7 is a perspective view similar to FIG. 4 showing a second embodiment of the present invention;

FIG. 8 is a horizontal cross sectional view of FIG. 7;

FIG. 9 is a cross sectional view taken substantially along line IX—IX in FIG. 8;

DETAILED DESCRIPTION OF THE PREFERRED EMBODIMENTS

As shown by the figures, the present invention is preferably for use on a multi-wheeled vehicle which includes a front shield or leg shield 1 which extends from the lower front portion of the multi-wheeled vehicle to cover the front portion of the vehicle, thereby acting to provide the vehicle operator with some protection. The rear panel of the leg shield 1 has a recess 2 which opens forwardly on the vehicle. The recess 2 extends vertically along the centerline of the front shield 1. A vehicle body frame (not shown) extends longitudinally in the recess 2. Located above the leg shield 1 is a steering handle for guidance of the vehicle. Below the shield is a front wheel guided by the steering handle. The frame and body of the vehicle extend rearwardly from the front leg shield to define a U-shaped structure in side view with a step floor, seat and engine compartment. A power unit acts with a rear swing arm assembly to mount and drive one or two rear wheels.

Figure 1:
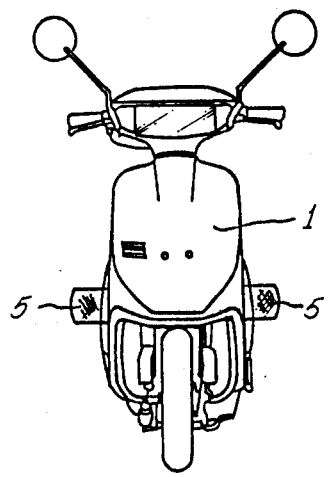
FIG. 1 is a front view of a multi-wheeled vehicle employing the present invention.
Figure 2:
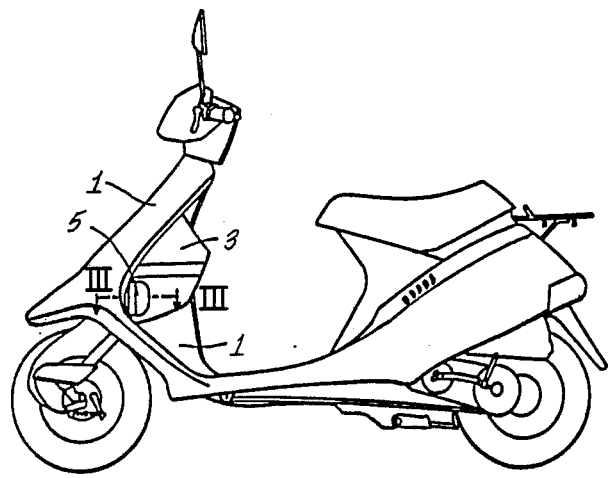
FIG. 2 is a side view of the multi-wheeled vehicle of FIG. 1.
Figure 3:
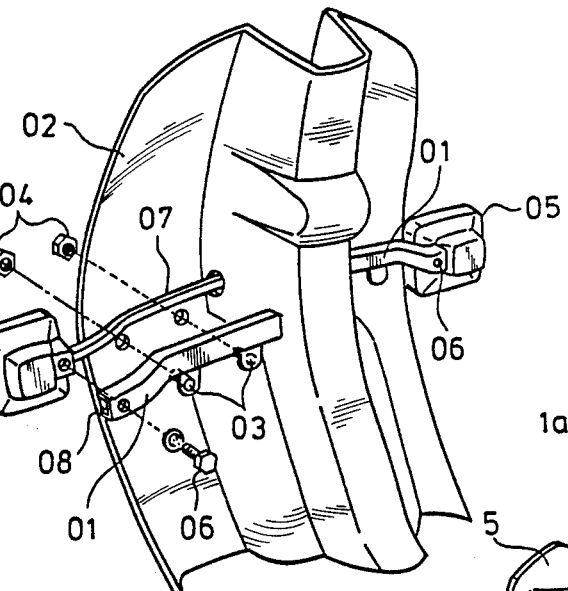
FIG. 3 is a perspective view showing the rear surface of a leg shield for a multi-wheeled vehicle including a mounting apparatus of the prior art.
Figure 4:
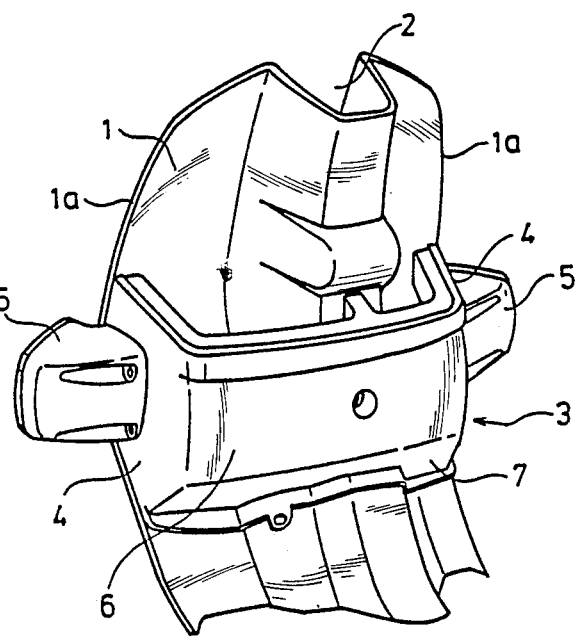
FIG. 4 is a perspective view showing the rear surface of a leg shield for a multi-wheeled vehicle including a first embodiment of the present invention.
Figure 5:
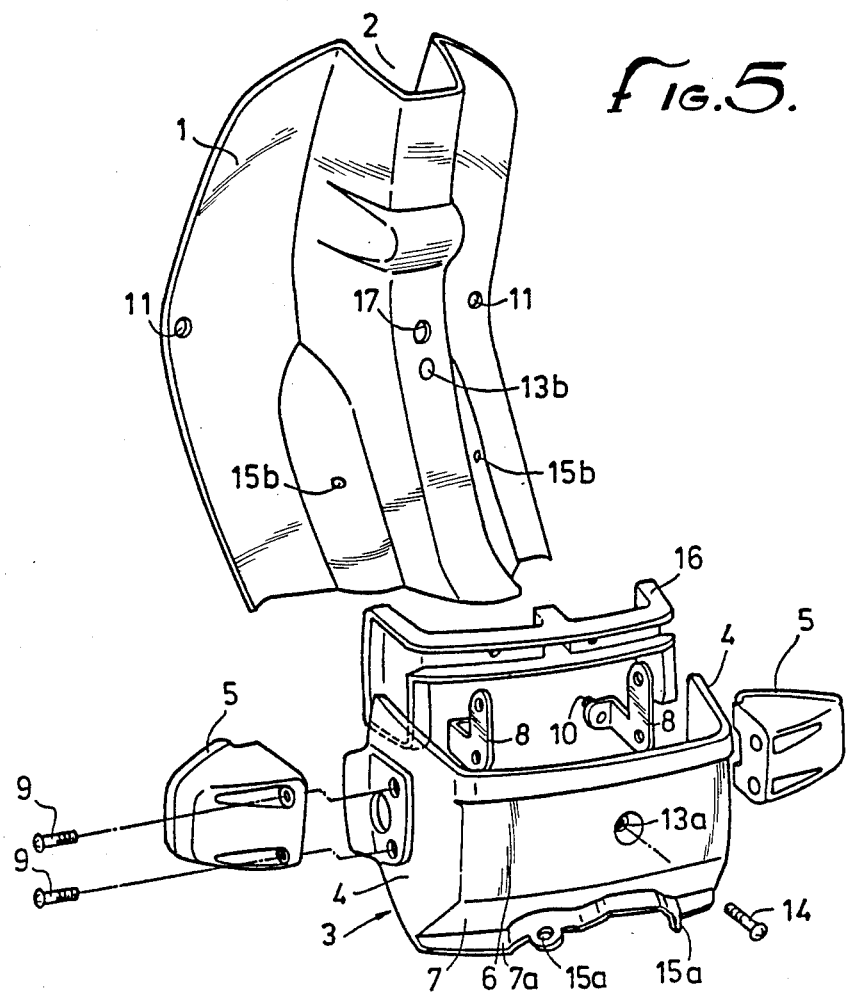
FIG. 5 is an exploded perspective view of FIG. 4.
Figure 6:
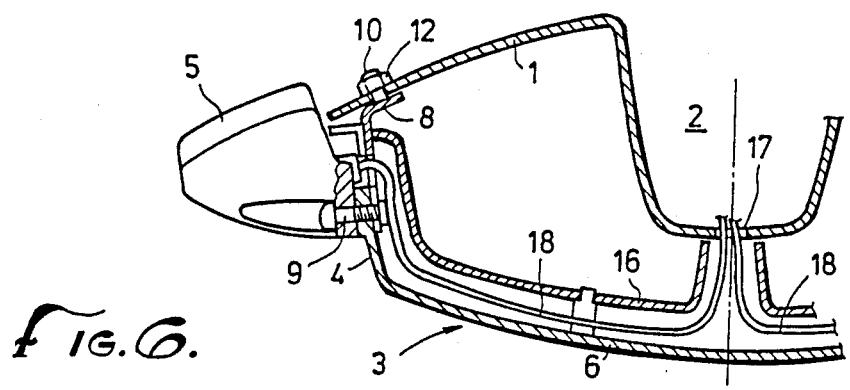
FIG. 6 is a horizontal cross sectional view of FIG. 4.

Referring to FIGS. 4 through 6, the first preferred embodiment of the present invention includes a partition member 3 which is preferably constructed from a hard resin material. The partition member 3 includes a rear plate portion 6, a bottom plate member 7 extending downwardly and forwardly from the rear plate portion 6 and a pair of side plate portions 4 extending forwardly from said rear plate portion 6. Each side plate portion 4 is arranged so as connect to one of the two opposite side edge portions 1a of the front shield 1 when the partition member is connected to the front shield. Similarly, the bottom plate portion 7 is arranged so as to extend downwardly and forwardly from the rear plate portion 6 so as to contact the back of the front shield 1 when the partition member 3 is connected to the front shield 1. So arranged, when assembled to the front shield 1, the partition member 3 of the first preferred embodiment forms a box-shaped storage container which is open along the upper portion thereof.

A first mounting piece 8, preferably substantially "L" shaped, connects to the rear surface of the front shield 1 and is arranged to cooperate with the partition member 3 for mounting the indicator 5 by means of removable connection means such as bolts 9. The mounting pieces 8 are preferably mounted to the front shield 1 through mounting bores 11 by means of bolts 10 and nuts 12. Once mounted to the shield 1, the mounting pieces 8 act to connect both the partition member 3 and the indicators 5 to the front shield 1 through the bolts 9.

The partition 3 is further connected to the front shield 1 by positioning a securing means such as by a nut and bolt arrangement 14 through a mounting bore 13a in the rear plate portion 6 of the partition 3 and a mounting bore 13b provided through the front shield 1. Similar securing means are preferably used to connect the flanged portion 7a of the bottom plate 7 of the partition member 3 to the front shield 1 through corresponding mounting bores 15a and 15b therein, respectively. Finally, a grooved liner member 16 is positioned along the upper edge of the partition member 3 between the shield 1 and the partition member 3 and, preferably, at least the part of the side plate portions 4 of the partition 3 on which the indicators are mounted. The grooved liner member 16 acts to shield the indicator electrical wires 18 which extend to the indicators 5 from the electrical cord passageway 17 in the shield 1. Preferably, the exterior surface of the respective side plate portions 4 are substantially flat so as to accommodate the mounting of indicators thereon.

Arranged as above, the partition member 3 includes a means for mounting indicators 5 as well as serving as a container for items preferably stored during operation of the vehicle. Moreover, the partition member 3 provides the back of the shield 1 with an improved outline and a better aesthetic feeling than the single purpose mounting bracket of the devices of the prior art. Moreover, the present invention decreases the difficulty in assembling and protecting the indicator means and their electrical connections and reduces the number of parts associated therewith. Lastly, since the present invention provides a flat relatively wide side plate portion 4 for mounting the indicators, the positioning of the indicators on this side plate portion 4 may be varied and a broader selection of indicator means having different shapes and structures may be utilized.

Referring now to FIGS. 7 through 9, a second preferred embodiment of the invention will be described in detail. In this embodiment, the partition member 3 is divided into left and right partition members 3a, 3b, respectively. Each of these partition members includes a rear plate portion 6a, 6b, respectively, and a side plate portion, 4a, 4b, respectively, each of which extend forwardly from the exterior side of each rear plate member 6a, 6b. As with the side plates in the first preferred embodiment, the side plate portions 4a, 4b, provide a substantially flat mounting portion along the exterior surface thereof so as to permit the mounting position of the indicator means 5 to be varied as necessary or desirable.

In addition, each rear plate portion 6a, 6b has a corresponding bottom plate member 7a, 7b, respectively, each of which extend forwardly and downwardly from the corresponding rear plate portion as in the first preferred embodiment. Moreover, each partition member 3a, 3b is provided with an inside plate portion 20a, 20b, respectively, and a front plate portion 21a, 21b, respectively. The inside plate portions and front plate portions are arranged such that each complete partition member itself is actually a box-shaped compartment which is open along its upper portion.

The inside plate portion 20a, 20b of each partition member 3a, 3b is attached by means of bolts 22 to the rear surface of the shield 1 and preferably also the side wall of the shield 1. The outer surface of each front plate portion 21a, 21b includes a groove 23 formed therein and extending laterally thereto. When each partition member 3a, 3b is connected to the front vehicle shield 1, the lateral grooves 23 act to protect the electrical wires 18 which extend to each indicator means 5.

Figure 10:
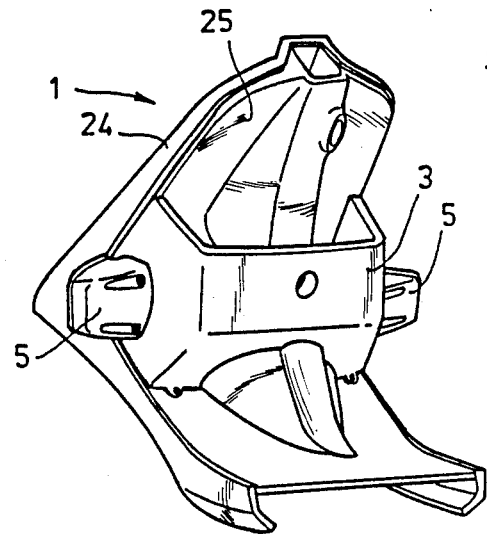
FIG. 10 is a perspective view similar to FIG. 4 showing a third embodiment of the present invention.
Figure 11:
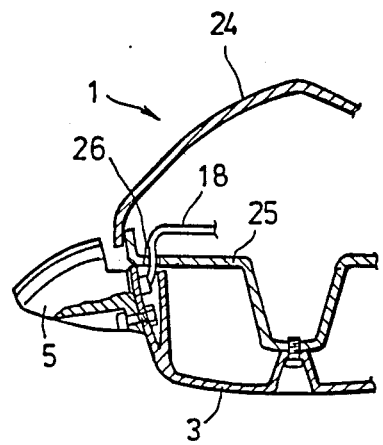
FIG. 11 is a horizontal cross sectional view of the embodiment shown in FIG. 10.
Figure 12:
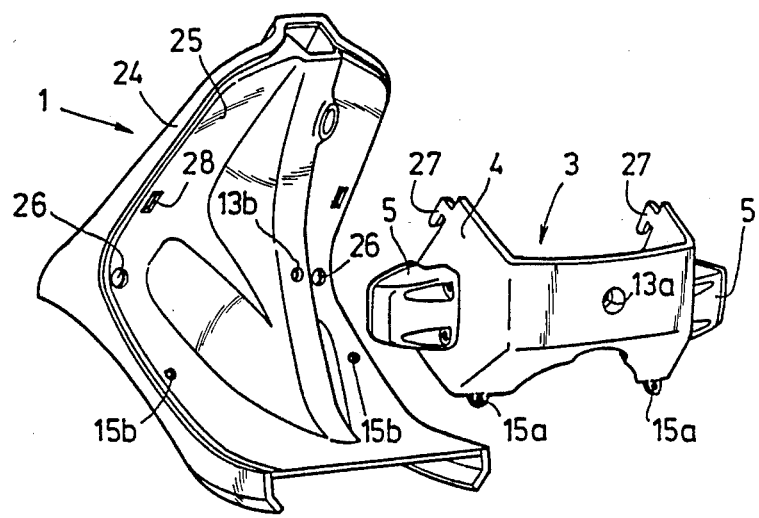
FIG. 12 is an exploded perspective view of the embodiment illustrated in FIG. 10.

A third embodiment of the present invention is illustrated in FIGS. 10 through 12. In this embodiment, the shield 1 includes a front cover 24 and a front inner cover 25. The electrical lead wires 18 are positioned in a space between the front cover 24 and the front inner cover 25. A partition member 3 similar to the partition member 3 of the first preferred embodiment is connected to the leg shield front inner cover 25 through mounting hooks 27 projecting from the front edge of each partition member side plate portion 4. By engaging the mounting hooks 27 with the hook bores 28 formed in the leg shield front inner cover 25, the partition member 3 may be supported on the front inner cover 25. The partition member is further connected to the front inner cover 25 by mounting means such as nuts and bolts through mounting bores 13a, 13b and 15a, 15b, similar to the first embodiment.

The indicators in the third preferred embodiment are also mounted directly to the side plate portions 4 of the partition member 3. As illustrated in FIG. 11, the partition member 3 is preferably provided with an exterior side plate portion 4 and an interior side plate portion 40. The indicator is mounted directly to the exterior side plate portion 4 while interior side plate portion 40 acts to maintain the alignment position of the partition member 3. The indicator lead wires 18 extend through the front inner cover 25 through appropriately positioned bores 26.

Figure 13:
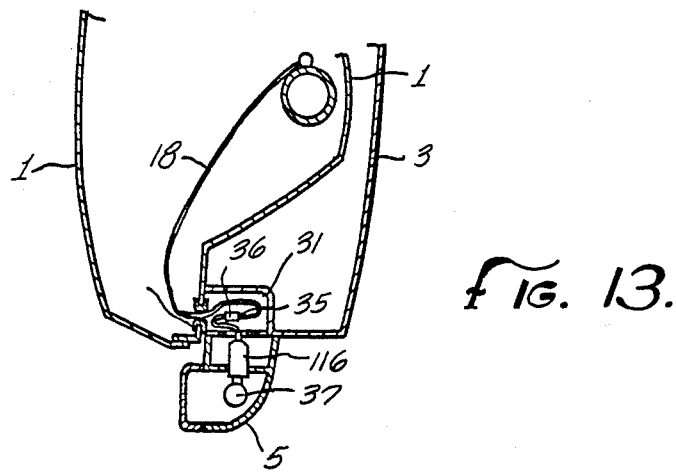
FIG. 13 is a horizontal cross-sectional view showing a fourth embodiment of the present invention.
Figure 14:
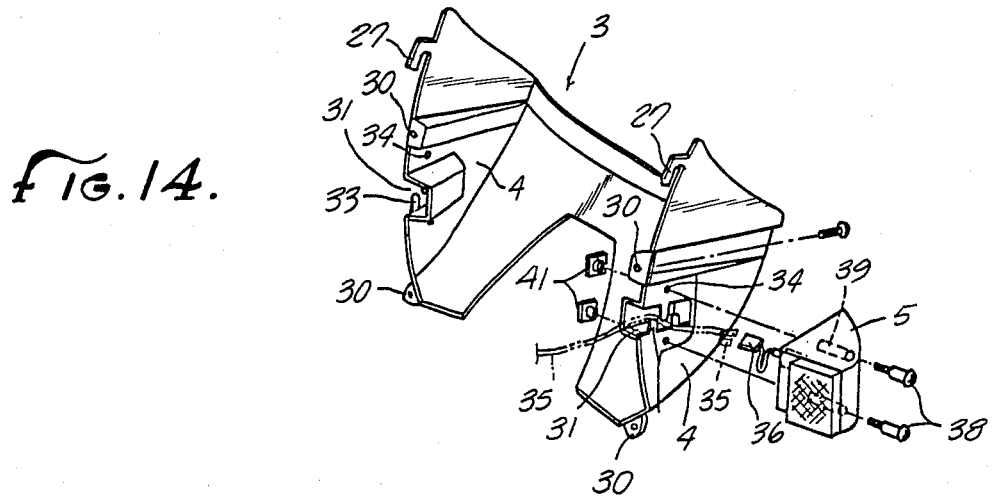
FIG. 14 is a partial perspective view of the fourth embodiment.
Figure 15:
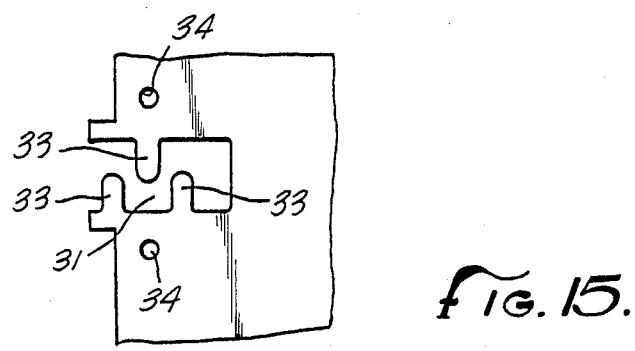
FIG. 15 is a front view of the partition member of the fourth embodiment showing the mounting recess therein.

FIGS. 13 through 15 illustrate another embodiment of the present indicator mounting means. As illustrated most clearly in FIG. 14, the partition member 3 preferably includes engagement hooks 27 as well as connector bores 30 for attaching the partition member 3 to the vehicle front cover 1. Each of the partition member side walls 4 includes an inwardly extending recess 31 formed therein. Extending across the recess are support projections 33. The projections 33 may be separately provided by a plate member or integrally formed with the partition member 3. As illustrated in FIGS. 14 and 15, the preferred embodiment includes one support projection 33 extending downwardly from the upper edge of the recess 31 and two support projections 33 extending upwardly from the lower edge of the recess 31. Moreover, as illustrated most clearly in FIG. 14, mounting bores 34 are also provided in the sidewalls 4 for connecting the indicators 5 thereto. The recess 31 is open at the forward end and abuts the outer rearward surface of the inner panel 25 of the front leg shield 1. A grommet 42, preferably constructed from an elasticly deformable or rubberized material, is positioned in an opening in the inner panel 25 of the front leg shield 1. The indicator electrical cords 18 extend into the recess 31 through the grommet 42.

As in all the previous embodiments of the present invention, the end of the indicator electrical cord is connected to the indicator 5 through a connecting terminal 116. The connecting terminal 116 is connected to a connecting cord 36 and the lamp 37 of the indicator. The indicator 5 is preferably secured to the side wall 4 of the partition means 3 by means of threaded bolts 38 passing through the mounting passages 39 in the indicator 5 and the mounting bores 34 in the side plates 4 to be secured by nuts 41.

The depth of the recess 31 is arranged such that it is large enough to accommodate the connecting cord 36, the connecting terminal 35 and the end of the electrical wire 18. The connecting pieces 33 act to permit access into the recess 31 while providing additional support for the indicator means 5 when it is mounted. Although three supporting pieces are illustrated in the present embodiment, other numbers of supporting pieces are contemplated by the present invention.

The description of the preferred embodiments above is merely for purposes of illustration. Rather, the scope of the present invention is limited only by the scope of the claims appended hereto.

I claim:

1. An indicator light mounting structure for use on a multi-wheeled vehicle having a vehicle frame, a front shield member including laterally spaced side edges adapted to be carried by said vehicle frame and at least one indicator light disposed laterally outwardly of the adjacent front shield side edge, said mounting structure comprising partition means having generally rectangularly disposed rear, bottom and oppositely spaced side panels forming an article storage space, means for securing said at least one indicator light to one of said side panels for disposition laterally outwardly of said front shield side edge, and means for detachably connecting said partition means to said front shield member.

2. The structure as set forth in claim 1 including means within the interior of said article storage space for protectively extending electrical wires from said vehicle frame for connection with said indicator light.

3. The structure as set forth in claim 2 in which said means for protectively extending comprises liner means extending along said partition means between said front shield member and said indicator light, and means forming a groove within said liner means for protectively enclosing said electrical wires.

4. The structure as set forth in claim 3 including an indicator light operatively disposed on each said side panel, and said liner means comprises a pair of liner members extending oppositely from said front shield to the respective side panels.

5. The structure as set forth in claim 2 in which said partition means comprise separate partition members in laterally spaced disposition on said front shield member and each said partition member including rectangularly disposed front, rear, bottom and oppositely spaced side panels forming an individual article storage space and means for mounting an indicator light on the laterally outer side of each said side panel.

6. The structure as set forth in claim 5 in which liner means in each said partition member comprises an integrally formed recess extending laterally of said front panels to said indicator light for protectively enclosing said electrical wires.

7. The structure as set forth in claim 1 in which said partition connecting means comprises means forming openings in said front shield member and engagement hooks on said partition means cooperable with said openings for detachably securing said partition means to said front shield member.

8. The structure as set forth in claim 1 in which said partition connecting means comprises a mounting piece projecting from said front shield member for securing each said side panel and threaded connector means for detachably connecting each said side panel to each said mounting piece.

9. The structure as set forth in claim 8 in which said threaded connector means attaches said indicator light and said mounting piece with said side panel interposed therebetween.

* * * * *